(12) United States Patent
Frank et al.

(10) Patent No.: US 11,985,990 B2
(45) Date of Patent: May 21, 2024

(54) CORN PROTEIN RETENTION DURING EXTRACTION

(71) Applicant: CARGILL, INCORPORATED, Wayzata, MN (US)

(72) Inventors: Christopher Lawrence Frank, Maple Grove, MN (US); Christopher Steven Huelsnitz, Blaine, MN (US); Erika Lyn McConville, Minneapolis, MN (US); Michael A. Porter, Maple Grove, MN (US); Adam John Steinbach, Saint Paul, MN (US); Hadi Nayef Yehia, Beavercreek, OH (US); Guo-Hua Zheng, Centerville, OH (US)

(73) Assignee: CARGILL, INCORPORATED, Wayzata, MN (US)

( * ) Notice: Subject to any disclaimer, the term of this patent is extended or adjusted under 35 U.S.C. 154(b) by 0 days.

(21) Appl. No.: 16/335,604

(22) PCT Filed: Oct. 6, 2017

(86) PCT No.: PCT/US2017/055498
§ 371 (c)(1),
(2) Date: Mar. 21, 2019

(87) PCT Pub. No.: WO2018/058150
PCT Pub. Date: Mar. 29, 2018

(65) Prior Publication Data
US 2019/0297915 A1    Oct. 3, 2019

Related U.S. Application Data

(60) Provisional application No. 62/398,632, filed on Sep. 23, 2016.

(51) Int. Cl.
*A23J 1/12* (2006.01)
*A23L 5/20* (2016.01)

(52) U.S. Cl.
CPC . *A23J 1/12* (2013.01); *A23L 5/23* (2016.08); *A23V 2002/00* (2013.01)

(58) Field of Classification Search
None
See application file for complete search history.

(56) References Cited

U.S. PATENT DOCUMENTS 2,105,760 A    1/1938   Swallen
2,120,946 A    6/1938   Swallen
(Continued)

FOREIGN PATENT DOCUMENTS

CN    1899076 A      1/2007
CN    101560252 A    10/2009
(Continued)

OTHER PUBLICATIONS

Database WPI, Week 198219, Thomson Scientific, London, GB; AN 1982-38049E, XP002794657, & JP S 57 54564 A (Nippon Shokuhin Kako KK), Apr. 1, 1982 (Apr. 1, 1982).
(Continued)

*Primary Examiner* — Lien T Tran

(57) ABSTRACT

Disclosed herein is a method of maintaining corn protein yield during extraction and managing stickiness and viscosity comprising obtaining a corn material having a corn protein content and washing the corn material to remove non-protein components with an ethanol-water solvent comprising at least 85 wt % ethanol to obtain a corn protein isolate, wherein the loss of corn protein content during extraction is less than 10% of total corn protein.

11 Claims, 4 Drawing Sheets

(56) References Cited

U.S. PATENT DOCUMENTS

| | | | |
|---|---|---|---|
| 2,124,284 A | 7/1938 | Bole | |
| 2,133,591 A | 10/1938 | Swallen | |
| 2,156,928 A | 5/1939 | Swallen | |
| 2,218,221 A | 10/1940 | Schopmeyer | |
| 2,227,605 A | 1/1941 | Swallen | |
| 2,360,381 A | 10/1944 | Walsh | |
| 2,384,388 A | 9/1945 | Monte | |
| 2,414,195 A | 1/1947 | Evans | |
| 2,704,257 A | 3/1955 | Diez De Sollano et al. | |
| 4,018,936 A | 4/1977 | Garbutt et al. | |
| 4,024,120 A | 5/1977 | Phillips | |
| 4,108,847 A | 8/1978 | Creinin | |
| 4,213,941 A | 7/1980 | Boomer | |
| 4,265,925 A | 5/1981 | Campbell | |
| 4,361,651 A | 11/1982 | Keim | |
| 4,624,805 A | 11/1986 | Lawhon | |
| 4,716,218 A | 12/1987 | Chen et al. | |
| 5,254,673 A | 10/1993 | Cook et al. | |
| 5,367,055 A | 11/1994 | Takahashi | |
| 5,410,021 A | 4/1995 | Kampen | |
| 5,498,431 A | 3/1996 | Lindner | |
| 5,510,463 A * | 4/1996 | Takahashi | A23J 3/18 426/656 |
| 5,580,959 A * | 12/1996 | Cook | A23J 3/18 426/656 |
| 5,602,286 A | 2/1997 | Muralidhara | |
| 5,798,446 A | 8/1998 | Neumueller | |
| 5,847,238 A * | 12/1998 | Muralidhara | C07C 403/24 568/816 |
| 6,169,217 B1 | 1/2001 | Cheryan | |
| 6,433,146 B1 | 8/2002 | Cheryan | |
| 6,602,985 B1 * | 8/2003 | McInnis | C07K 14/415 530/373 |
| 6,610,831 B1 | 8/2003 | McInnis et al. | |
| 6,846,909 B2 | 1/2005 | Mairal et al. | |
| 7,045,607 B2 | 5/2006 | Cheryan | |
| 7,829,680 B1 | 11/2010 | Sander | |
| 8,795,760 B2 | 8/2014 | Lawton | |
| 9,226,515 B2 | 1/2016 | Van et al. | |
| 2001/0009040 A1 | 7/2001 | Duvick | |
| 2002/0183490 A1 | 12/2002 | Cheryan | |
| 2003/0066106 A1 | 4/2003 | Strissel et al. | |
| 2003/0198725 A1 | 10/2003 | Cardenas | |
| 2004/0009263 A1 | 1/2004 | Liu et al. | |
| 2005/0008759 A1 | 1/2005 | Nie et al. | |
| 2005/0064079 A1 | 3/2005 | Allen et al. | |
| 2005/0074538 A1 | 4/2005 | Elder et al. | |
| 2006/0057275 A1 | 3/2006 | Wu et al. | |
| 2006/0182857 A1 | 8/2006 | Thorre | |
| 2006/0240169 A1 | 10/2006 | Heydtmann et al. | |
| 2007/0087101 A1 | 4/2007 | Gusek et al. | |
| 2007/0172914 A1 | 7/2007 | Slabbekoorn et al. | |
| 2008/0102502 A1 | 5/2008 | Foody et al. | |
| 2008/0118626 A1 | 5/2008 | McWilliams et al. | |
| 2009/0041901 A1 | 2/2009 | Elmusa et al. | |
| 2009/0053368 A1 | 2/2009 | Fox et al. | |
| 2009/0148589 A1 | 6/2009 | Fox et al. | |
| 2009/0209423 A1 | 8/2009 | Slabbekoorn | |
| 2009/0215990 A1 * | 8/2009 | Cheryan | C07K 14/415 530/373 |
| 2010/0016554 A1 | 1/2010 | Cheryan | |
| 2010/0159521 A1 | 6/2010 | Cirakovic et al. | |
| 2010/0221387 A1 | 9/2010 | Cristianini et al. | |
| 2010/0233756 A1 | 9/2010 | Sunvold et al. | |
| 2012/0027890 A1 | 2/2012 | Cerne | |
| 2013/0273219 A1 | 10/2013 | Baier | |
| 2014/0123855 A1 | 5/2014 | Lawton et al. | |
| 2014/0161962 A1 | 6/2014 | Boebel | |
| 2014/0193547 A1 | 7/2014 | Brown et al. | |
| 2014/0220217 A1 | 8/2014 | Brown et al. | |
| 2014/0271928 A1 | 9/2014 | Rehage | |
| 2014/0303348 A1 | 10/2014 | Lawton | |
| 2014/0343259 A1 | 11/2014 | Bleyer et al. | |
| 2014/0356510 A1 | 12/2014 | Schweizer et al. | |
| 2015/0201647 A1 | 7/2015 | Fosdick et al. | |
| 2016/0165932 A1 | 6/2016 | Armentrout | |
| 2016/0286840 A1 | 10/2016 | Shane | |
| 2017/0354737 A1 * | 12/2017 | Harel | A23L 33/125 |
| 2019/0029295 A1 | 1/2019 | Mielgo Iza et al. | |
| 2020/0236977 A1 | 7/2020 | Li | |

FOREIGN PATENT DOCUMENTS

| | | |
|---|---|---|
| CN | 102037134 A | 4/2011 |
| CN | 101703146 B | 11/2011 |
| CN | 102669406 A | 9/2012 |
| CN | 103059116 A | 4/2013 |
| CN | 103554278 A | 2/2014 |
| CN | 104938763 A | 9/2015 |
| CN | 105541982 A | 5/2016 |
| CN | 106009766 B | 11/2017 |
| EP | 0510537 A1 | 10/1992 |
| EP | 0648078 A1 | 4/1995 |
| EP | 2401920 A1 | 1/2012 |
| EP | 2491794 A1 | 8/2012 |
| EP | 3075259 A1 | 10/2016 |
| EP | 3375290 A2 | 9/2018 |
| FR | 2902607 A1 | 12/2007 |
| JP | 5754564 A | 4/1982 |
| JP | 63185998 | 8/1988 |
| JP | 63185999 | 8/1988 |
| JP | H07179334 A | 7/1995 |
| JP | 2011097928 A | 5/2011 |
| JP | 4750901 B2 | 8/2011 |
| JP | 06189687 B2 | 3/2015 |
| KR | 101409213 B1 | 6/2014 |
| WO | 8809622 A1 | 12/1988 |
| WO | 9112730 A2 | 9/1991 |
| WO | 9312667 A1 | 7/1993 |
| WO | 9844807 A1 | 10/1998 |
| WO | 0150882 A2 | 7/2001 |
| WO | 2005074704 A1 | 8/2005 |
| WO | 2005091995 A2 | 10/2005 |
| WO | 2007019227 A1 | 2/2007 |
| WO | 2009155350 A1 | 12/2009 |
| WO | 2014186567 A1 | 11/2014 |
| WO | 2015004448 A1 | 1/2015 |
| WO | 2015109276 A1 | 7/2015 |
| WO | 2016154441 A1 | 9/2016 |
| WO | 2017011625 A1 | 1/2017 |
| WO | 2017040273 A3 | 4/2017 |
| WO | 2017058501 A1 | 4/2017 |
| WO | 2017081347 A2 | 5/2017 |
| WO | 2017165748 A1 | 9/2017 |
| WO | 2017165756 A1 | 9/2017 |
| WO | 2017189322 A1 | 11/2017 |
| WO | 2018058150 A1 | 3/2018 |
| WO | 2018237030 A1 | 12/2018 |
| WO | 2019028263 A2 | 2/2019 |
| WO | 2019060179 A1 | 3/2019 |
| WO | 2019060673 A1 | 3/2019 |

OTHER PUBLICATIONS

Lim, Ho-Soo, et al., "Comparison of four different methods for the determination of sulfites in foods marketed in South Korea", Food Additives & Contaminants: Part A, 3014, vol. 31, No. 2, 187-196, DOI: 10.1080/19440049.2013.857048.

(International Standard ISO) Native starch—Determination of starch content—Ewers polarimetric method. ISO 10520. Sep. 1997.

(Solvay Interox) "Hydrogen Peroxide Controlling reduced sulphur compounds" Mar. 2011; [retrieved May 25, 2017]. Retrived from the Internet: <URL:http://www.solvay.com.au/en/binaries/Controlling%20reduced%20suphur%20species-202502.pdf>.

International Search Report dated Dec. 28, 2017 of PCT/US2017/055498 filed Oct. 6, 2017 (3 pages).

Wu, YV, et al., "Protein-Rich Residue from Corn Alcohol Distillation: Fractionation and Characterization", Cereal chemistry, vol. 58, No. 4, Apr. 1981, pp. 343-347.

(56) References Cited

OTHER PUBLICATIONS

Wu, Y, et al., "balancing of sulfur storage in maize seed", BMC plant biology, vol. 12, May 30, 2012, 77: abstract; p. 3, figure 1; p. 8, col. 1, paragraph 2, May 2012, 3, 8.
Shukla, Rishi, et al., "Zein: the industrial protein from corn", Industrial Crops and Products 13 (2001), 171-192.
Sessa, David J., et al., "Improved Methods for Decolorizing Corn Zein", Industrial Crops and Products 18 (2003), 2003, 55-65.
Phillips, R. Dixon, et al., "Corn Protein Concentrate: Functional and Nutritional Properties", Food Science, vol. 44, Issue 4 (Jul. 1979): pp. 1152-1155.
Momany, Frank A., et al., "Structural Charecterization of a-Zein", Journal of Agricultural and Food Chemistry, 2006, 54, 543-547.
Lawton, John W, "Zein: A History of Processing and Use", American Association of Cereal Chemists, Inc., vol. 79, No. 1, 2002, 1-18.
McNeillie, Alastair, and Juli Bieser. "Hydrogen peroxide uses for the year 2000." Food Processing Oct. 1993: 59+. Business Insights: Global. Web. Feb. 9, 2016.
Anderson, Timothy J., et al., "Development of New Method for Extraction of a-Zein from Corn Gluten Meal Using Different Solvents", Cereal Chem. 88(4), 356-362.
Anderson, Timothy J., et al., "Zein Extraction from Corn, Corn Products, and Coproducts and Modifications for Various Applications: A Review", Cereal Chem. 88(2): 159-173, 2011.
Bryla, Marcin, et al., "Effects of pH and Temperature on the Stability of Fumonisins in Maize Products", Toxins 2017, 9, 88; doi:10.3390/toxins9030088.
Dickey, L.C., "Ethanolic Extraction of Zein from Maize", Industrial Crops and Products 13 (2001), Apr. 30, 2000, 67-76.
Dombrink-Kurtzman, et al., "Effect of Nixtamalization (Alkaline Cooking) on Fumonisin-Contaminated Corn for Production of Masa and Tortillas", J. Agric. Food Chem., vol. 48(11): pp. 5781-5786, 2000.
Gomez, M. H., et al., "Changes in the Starch Fraction During Extrusion-cooking of Corn", Food Science, vol. 48, Issue 2 (Mar. 1983); pp. 378-381.
Hojilla-Evangelista, Mila P., et al., "Sequential Extraction Processing of High-Oil Corn", Cereal Chemistry, AACC International Inc., US, vol. 8, No. 6, Nov. 1, 2003 (Nov. 1, 2003), pp. 679-683, XP001185001, ISSN: 0009-0352.
Inglett, GE, et al., "high-shear, jet-cooking, and alkali treatment of corn distillers' dried grains to obtain products with enhanced protein, oil and phenolic antioxidants", food science and technology international, vol. 16, No. 4, Jul. 9, 2010, pp. 297-308; abstract; p. 298, col. 1, paragraph 5; p. 298, col. 2, paragraph 2; p. 300, table 2, Jul. 2010, 297-308.
Johansson, D, et al., "influence of surface lipids in commercial zein on microstructure and rheological properties of gluten-free dough", annual transactions of the nordic rheology society, vol. 20, 2012, pp. 247-251; p. 247, col. 1, paragraph 1; p. 247, col. 2, paragraph 4; p. 248, col. 1, paragraph 1; p. 248, figure 1, 2012, 247-251.
"The Corn Refining Process" 2 pages, downloaded from https://corn.org/wp-contentiuploads/2009/11/CornRefiningProcess.pdf (Year: 2009).
Anderson, "Detoxification of Aflatoxin-Contaminated Corn", Proc. Symp. held in Atlanta, Ga., Jan. 26-27, 1982. Soth. Coop. Ser. Bull. 279:87-90 (Year: 1982).
Anderson, R. A.; "Detoxification of Aflatoxin-Contaminated Corn", Cereal Chemistry, 55, 87-90, Jan. 31, 1978.
Anderson, Timothy James, "Extraction of zein from corn co-products", Master thesis, 2011, Food Science and Technology, Iowa State University, pp. i-v and 1-114.
Anonymous: "Establishing Instrumental color difference tolerances for your products", Jan. 1, 2008 (Jan. 1, 2008), pp. 1-17, XP093085388, Retrieved from the Internet: URL:https://support.hunterlab.com/hc/en-us/article_attachments/201371449 [retrieved on Sep. 25, 2023].
Argos et al. (in J. Biol Chem. vol. 217 (17): pp. 9984-9990, 1982).
Bookwalter Corn Distillers Grains and Other By-Products of Alcohol Production in Blended Foods. II. Sensory, Stability, and Processing Studies, Cereal Chem. vol. 61, No. 6, 1984, 509-513.
Burns TD et al: Fumonisin concentrations and in vivo toxicity of nixtamalized Fusarium verticillioides culture material: Evidence for fumonisin-matrix interactions, Food and Chemical Toxicology, Pergamon, GB, vol. 46, No. 8, Aug. 1, 2008 (Aug. 1, 2008), pp. 2841-2848, XP022939030, ISSN: 0278-6915, DOI: 10.1016/J.FCT.2008.05.017 [retrieved on May 29, 2008].
CIELAB color space—Wikipedia; https://en.wikipedia.org/wiki/CIELAB_color_space; retrieved Oct. 5, 2019; 9 pages.
Dougls, "What is the difference betwen corn meal& corn gluten meal?", published Jul. 8, 2011, web link: https://healthfully.com/302484-what-is-the-difference-between-corn-meal-corn-gluten-meal.html (Year: 2011).
El-Hawwary et al. (in Agric. Res. Review 67 (4): 611-618, 1989).
Gupta Ho et al: "Plant Foods for Human Nutrition 52: Processing of maize germ oil cake into edible food grade meal and evaluation of its protein quality", Plant Foods for Human Nutrition, vol. 52, Mar. 1, 1998 (Mar. 1, 1998), pp. 1-8, XP055808466, Retrieved from the Internet: URL:https://link.springer.com/content/pdf/10.1023/A:1008088822395.pdf>.
Hojilla-Evangelista met al: "Optimizing extraction of zein and glutelin-rich fraction during sequential extraction processing of corn", Cereal Chemistry, AACC International Inc, us, vol. 80, No. 4, Jan. 1, 1979 (Jan. 1, 1979), pp. 481-484, XP009092386, ISSN: 0009-0352, DOI: 10.1094/CCHEM.2003.80.4.481.
Hojilla-Evangelista MP et al: "Characterization of Protein Extracted From Flaked, Defatted, Whole Corn By the Sequential Extraction Process!", Journal of the American Oil Chemists Society, Springer, DE, vol. 69, No. 3, Mar. 1, 1992 (Mar. 1, 1992), pp. 199-204, XP000245384, ISSN: 0003-021X, DOI: 10.1007/BF02635886.
Ivanova et al. "Producing of Feed protein concentrates as a method for rational utilization of recyclable fish materials" Food processing Industry Issue Dec. 2011 abstract.
Johnson et al., "Optimizing Extraction of Zein and Glutelin-Rich Fraction During Sequential Extraction Processing of Corn", Cereal Chem. vol. 80, No. 4, 2003, 481-484.
L Rey et al. Drugs and Pharmaceuticals Sciences "Freezing Drying Lyophilization of Pharmaceutical and Biological Products" Chap 1 2004 (Year: 2004).
Mao et al. (in Int. J. Mol. Sci. 15, 2003-2014, 2014).
Nielsen et al. (in Cereal Chemistry, vol. 47 (5): pp. 501-512, 1970).
Parris net al: "Extraction and Solubility Characteristics of Zein Proteins From Dry-Milled Corn", Journal of Agricultural and Food Chemistry, American Chemical Society, US, vol. 49, No. 8, Aug. 1, 2001 (Aug. 1, 2001), pp. 3757-3760, XP001071383, ISSN: 0021-8561, DOI: 10.1021/JF0011790.
Paulson et al. (1984) Can. Inst. Food Sci. Technol. J. 17:202-208.
Reiners et al., "Corn Proteins: Potential for their Industrial Use" 58th Annual American Association of Cereal Chemists, 1973.
Ren Ting-ting, et al., "Research on extraction of zein and its functional properties and application", Science and Technology of Cereals, Oils and Foods. vol. 22. Issue 3, May 21, 2014.
Selling et al: "The effect of extrusion processing on Zein", Polymer Degradation and Stability, Bark I NG, GB, vol. 95, No. 12, Dec. 1, 2010 (Dec. 1, 2010), pp. 2241-2249, XP027527379, ISSN: 0141-3910.
Sydenham etal. J. Agric. Food Chem. 1995, vol. 43, pp. 1198-1201 (Year: 1995).
Takahara et al., JP4750901(B2)—English Translation, pp. 1-55 (Year: 2011).

\* cited by examiner

US 11,985,990 B2

CORN PROTEIN RETENTION DURING EXTRACTION

This application is a national phase application of PCT/US2017/055498, filed Oct. 6, 2017, entitled CORN PROTEIN RETENTION DURING EXTRACTION, which claims the benefit of U.S. Provisional Patent Application No. 62/398,632, filed Sep. 23, 2016, entitled CORN PROTEIN RETENTION DURING EXTRACTION, each of which is hereby incorporated by reference herein in its entirety.

TECHNICAL FIELD

This disclosure relates to isolated corn protein and methods of isolating corn protein.

BACKGROUND

For over 100 years, corn wet milling has been used to separate corn kernels into products such as starch, protein, fiber and oil. Corn wet milling is a two-stage process that includes a steeping process to soften the corn kernel to facilitate the next wet milling process step that results in purified starch and different co-products such as oil, fiber, and protein. Further corn processing methods are now being investigated to further purify the protein co-product for incorporation into food-grade products, specifically. A combination of increasing interest on the part of consumers for protein in their diet and increasing concerns about the cost and availability of animal derived proteins is causing food companies to look increasingly for new sources of protein.

SUMMARY

Disclosed herein is a method of maintaining corn protein yield during extraction and managing stickiness and viscosity comprising obtaining a corn material having a corn protein content and washing the corn material to remove non-protein components with an ethanol-water solvent comprising at least 85 wt % ethanol to obtain a corn protein isolate, wherein the loss of corn protein content during extraction is less than 10% of total corn protein.

FIGURES

DETAILED DESCRIPTION

Figure 1:
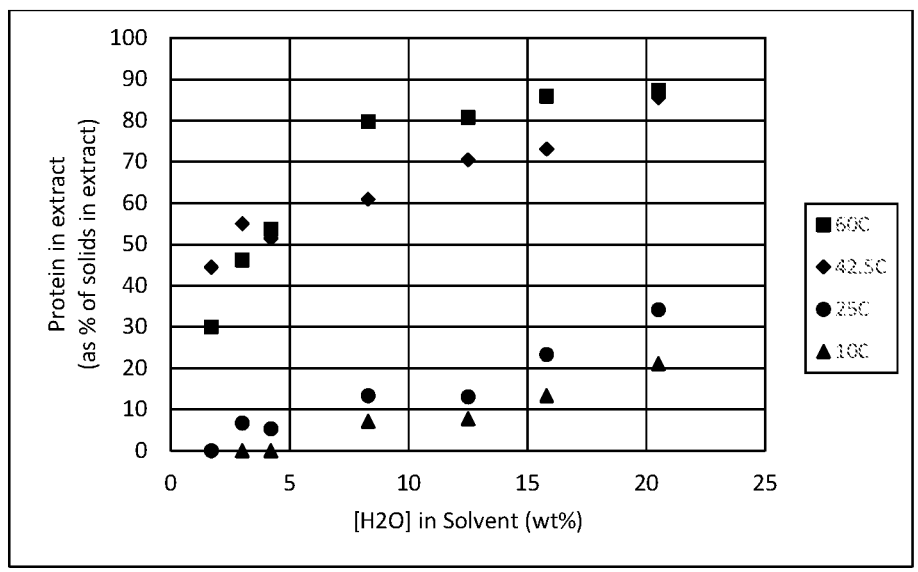
FIG. 1 illustrates the amount of protein in the extract at different temperatures, based on data from Table 2.

Protein ingredients are among the more expensive to prepare in high concentration. Often starting from a low concentration natural product, many food proteins are prepared from by-products of processes intended to recover other components. For example, soy protein isolate is prepared from the soy solids remaining after extraction of the oil fraction. Whey protein is prepared from the soluble protein remaining after formation and pressing of cheese. The corn protein described herein is prepared from a corn material, preferably corn gluten meal, which is a by-product of starch production in a wet milling process. Even more preferably, the corn gluten meal may be destarched to further increase the protein concentration to produce a corn protein product suitable for feed. Typically the destarched corn gluten meal comprises at least 70 wt % corn protein thus yielding a corn protein isolate product comprising 87-98 wt % corn protein on a dry weight basis according to the method described herein. Corn gluten meal that is not destarched comprises at least 55 wt % corn protein on a dry weight basis and typically yields a corn protein concentrate product comprising 55-80 wt % corn protein on a dry weight basis) according to the method described herein.

"Destarched" refers to the starting corn gluten material having a residual insoluble starch solids in the range from about 0.1 wt % to 3.0 wt % (ds), as measured by Ewers' Polarimetric method ISO 10520:1997. In at least certain preferred aspects, the residual starch solids in such starting corn gluten material may be in the range from about 0.1 to 2.0 wt % (ds), about 0.1 to 1.0 wt % (ds), or about 0.1 to 0.75 wt % (ds). However, if a corn gluten material is not destarched, the corn gluten material may undergo enzyme or chemical hydrolysis and a subsequent separation step to hydrolyze and remove, respectively, the majority of starch components contained in the corn gluten material.

In some aspects, the corn gluten material may be the corn protein concentrate described in U.S. Pat. No. 9,226,515. A typical analysis of such corn protein concentrate (e.g., Empyreal® 75, Cargill, Incorporated, Wayzata, MN) comprises about 75 wt % to 80 wt % protein on a dry weight basis, about 4.5% fat, about 5% soluble carbohydrates, and other nutrients (as-is basis), and has a bright yellow or gold color. Such corn protein concentrate may be introduced in dried "cake" form or in wet "cake" form (comprising about 40-60% moisture).

Normally, the corn gluten material contains lipids (free fatty acids, phospholipids, sterols, tri-, di- and monoglycerides, etc.), pigments (lutein, beta-carotene, zeaxanthin, etc.), soluble carbohydrates (glucose, maltose, maltotriose and higher oligomers of glucose), organic acids (acetic, propionic, succinic, etc.) and in some circumstances mycotoxins (aflatoxin, zealerone, etc.). Thus this product is at risk of generating soapy or rancid flavors from the lipids, astringent or sour flavors from the organic acids, undesirable colors in foods that contain the corn protein concentrate or health risks from the mycotoxins. Converting the concentrate from a form suitable for feed to a form desirable for food requires maximum removal of the lipid, pigment, mycotoxin and organic acids.

Because protein ingredients are already expensive, it is beneficial to prepare these ingredients at as low a cost as possible. Developing a process to achieve a desired final corn protein product with the highest protein yield and lowest cost is critical. In this context, the protein must be useful in foods for human and animal consumption, so the optimization is not simply a function of achieving an acceptable chemical composition; the resulting ingredient must have functional behavior suitable for the food process and product it is used in. It is recognized that some foods intended for animals, like pet foods, have functionality requirements similar to those required for human foods.

Described herein is the production of a corn protein product starting with corn gluten material, preferably a corn protein isolate, comprising more than 55 wt % corn protein on a dry weight basis, preferably greater than 85 wt % corn protein on a dry weight basis, and even more preferably greater than 90 wt % corn protein on a dry weight basis. The desired corn protein product will comprise less than 2 wt % oil, preferably less than 1 wt % oil, and even more preferably less than 0.5 wt % oil, and yet more preferably less than 0.1 wt % oil, all on a dry basis. The corn protein product is light in color with an "a*" color value ranging from −0.05 to 4, and more preferably −0.05 to 1.5, a "b*" color value ranging from 10 to 35, and more preferably 10 to 25, and an "L*" color value ranging from 70 to 92, and more preferably 88 to 92.

A general process for production of such corn protein product has been described in pending patent applications PCT Patent Application No. PCT/US16/24020 (filed on Mar. 24, 2016) and U.S. Patent Application No. PCT/US17/23999 (filed on Mar. 24, 2017), which are hereby incorporated by reference in their entirety. Described therein is a process by which corn material undergoes a series of solvent washing steps to produce a corn protein product.

In the course of developing a process to prepare a corn protein product that meets these expectations, it was discovered that the water present in the process had a number of effects on the process and that good control of the water concentration at various stages of the process is desirable. For example, excess water in the extracting solvent, especially at elevated temperatures, dissolves a portion of the protein and removes it from the final corn protein product. This did not tend to diminish the purity of the final corn protein product, but it substantially decreased the protein yield. Under some conditions, greater than 35% of the protein is lost. While this protein could be recovered from the extract and returned to the main ingredient pool, this recovery requires additional equipment investment and expense in operations. It is more economical to prevent the dissolution of the protein in the initial extraction phase.

Another undesirable phenomena associated with protein processing is fouling of surfaces, especially heat-contact surfaces. It was discovered that the water concentration in the extraction process could have a significant effect on the tendency of the protein to stick to surfaces. Equipment can be modified, particularly designed to be oversized to manage this stickiness, but that increases both the capital and operating expenses of the operation. It is more economical to manage the water concentration to mitigate this effect.

A final undesirable outcome is obtained when the water concentration present in the extraction process during extraction creates a physical behavior of the finished ingredient that is undesirable. Too much or too little water during extraction can modify the susceptibility of the corn protein product to physical or chemical reaction during extraction or subsequent processing. Identifying and applying specific water concentrations can be used to create specific functionalities. Because different foods and food processes have differing functional requirements, water management may lead to multiple different functionalities.

Accordingly, the invention described herein provides a method of maintaining corn protein yield, managing stickiness, and managing viscosity during an extraction process to obtain a desirable corn protein isolate.

The extraction process includes the steps of obtaining a corn gluten material and washing the corn gluten material with an ethanol-water solvent comprising at least 85 wt % ethanol to obtain a corn protein product, preferably corn protein isolate. As previously described, it was found surprising that reducing water content during the extraction process provides enhanced corn protein yield and desirable stickiness and viscosity functionality. Accordingly, in more preferable aspects, the ethanol-water solvent comprises at least 90 wt % ethanol, and even more preferably at least 95 wt % ethanol. Temperature also surprisingly affected the corn protein yield and functionality properties, hence lower extraction temperatures are more desirable. More specifically, the extraction method described herein occurs at temperatures ranging from about 5-50° C. and even more preferably range from about 20-30° C.

As demonstrated in the examples below, the combination of reducing water content and operating at lower temperatures improves the corn protein yield such that the loss of protein during extraction is less than 10% of total corn protein, and even more preferably less than 5% total corn protein. Total corn protein is determined as the total nitrogen analyzed by combustion multiplied by 6.25; the nitrogen is primarily in the form of amino acids. Corn protein yield is expressed as the fraction of the protein present in the raw corn gluten material that is recovered in the final corn protein product. In the aspects described herein, the corn protein yield is preferably greater than 0.85, even more preferably greater than 0.90, and even more preferably greater than 0.95.

Furthermore, related to stickiness, the extraction processing conditions described herein produce a corn protein product having a maximum compressibility strain of 0.600, preferably a maximum compressibility strain of 0.500, and even more preferably a maximum compressibility strain of 0.450. The corn protein product also has a tack force ranging from −1.000 to 0. Related to viscosity, the extraction processing conditions described herein product a corn protein product having a desirable viscosity ranging from 1500-3500 centipoise at a temperature ranging from 5–45° C. The examples outlined below provide further support.

EXAMPLES

Example 1

Wet cake of de-starched corn protein concentrate (Empyreal® wet cake) was obtained from the corn milling plant in Blair, NE. The wet cake contained 62.42% moisture. Experiments were carried out in 50-ml polyethylene test tubes with screw caps at 4 different temperatures of 60° C., 42.5° C., 25° C. (ambient) and 10° C. About 28-35 g of either aqueous ethanol at 90% (wt/wt) or 100% absolute EtOH contained in 50-ml screw-capped polyethylene test tubes were pre-equilibrated at perspective temperatures for 30 min then about 1 g to about 8 g wet cake were added to each test tube to create tests with different water concentrations in the extraction system (Table 1).

TABLE 1

Experimental conditions for Empyreal ® cake

| Treatment | Wet cake g used | EtOH solvent (wt/wt) | | | | Ratios, g/g | | | |
|---|---|---|---|---|---|---|---|---|---|
| | | % EtOH used | g EtOH used | g solv/g cake (37.58% DS) | % EtOH in final solvent | solvent/ 100% DS | water/ 100% DS | EtOH/ 100% DS | EtOH/ water |
| 1 | 8 | 90 | 32 | 4 | 79.5 | 12.31 | 2.73 | 9.58 | 3.8 |
| 2 | 4 | | 32 | 8 | 84.2 | 22.95 | 3.79 | 19.16 | 5.3 |
| 3 | 1.5 | | 30 | 20 | 87.5 | 54.88 | 6.98 | 47.9 | 7 |
| 4 | 5 | 100 | 32.5 | 6.5 | 91.7 | 18.96 | 1.66 | 17.3 | 11 |
| 5 | 2 | | 28 | 14 | 95.8 | 38.92 | 1.66 | 37.25 | 22.8 |
| 6 | 1.5 | | 30 | 20 | 97 | 54.88 | 1.66 | 53.22 | 32.3 |
| 7 | 1 | | 35 | 35 | 98.3 | 94.8 | 1.66 | 93.14 | 57.8 |

The test tubes containing both wet cake and ethanol solvent were placed horizontally into shakers set at 10° C., 25° C. (ambient), 42.5° C. or 60° C. and 100 rpm for exactly 60 min. A liquid-solid separation was observed when the test tubes were taken out from the shaker and placed standing still on bench top at ambient for about 1 min. Two (2.00) ml of the supernatant was pipetted after 3 min standing on the bench top at ambient into pre-weighed ceramic Leco cells with tin liners. The Leco cells were placed in a fume hood at ambient temperature to allow EtOH evaporation for 4-20 hours before being further dried in a vacuum oven at 55° C. and 20-25 inches vacuum for 4 hours. After recording dry weight, the cells were loaded on Leco nitrogen analyzer for protein determinations using a nitrogen-protein conversion factor of 6.25. Total volumes of the supernatant were recorded for the calculations of total solid, protein and non-protein (total minus protein) solubilized. Two test tubes (duplicate) were prepared and analyzed for each treatment.

Examination of the data (Table 2) shows that the amount of both dissolved solids and protein increases as the concentration of water increases. The amount of dissolved solids and protein also increases as the temperature increases. At low [H2O] or low temperature, the dissolved protein is a small percentage of the total dissolved solids, but occupies an increasing percentage of the dissolved solids as the [H2O] or temperature increase. The effect is visualized in FIG. 1. This indicates that an efficient extraction would favor low [H2O] and low temperature, though one skilled in the art may choose to keep either factor low, if there was a purpose that could be achieved by allowing either factor alone to increase.

Example 2

Destarched corn protein concentrate was collected from commercial operations of Cargill at its Blair Nebraska corn wet milling facility. The material was collected by diverting a portion of the vacuum drum feed slurry to a pilot scale vacuum drum filter where the rinse water was supplemented with 1% w/w H2O2 for sulfite control. The resulting cake was collected in large plastic bags, sealed and frozen. Frozen destarched corn gluten feed was broken into smaller pieces and freeze dried to produce a uniform "dry" raw material with minimal drying damage. The wet cake was freeze-dried and the freeze-dried material contained 9.34% moisture, 76.89% protein (N×6.25) and 4.8% lipid (by hexane extraction) on as-is basis. On dry weight basis, the material contained 59.1 mg pigment (lutein equivalent), 3.42 g soluble carbohydrate and 0.74 g organic acids (namely lactic acid, citric acid, propionic acid, acetic acid and succinic acid) per 100 g dry solids (DS). The freeze dried material was ground in Waring blender at low speed till ~3+mm large pieces disappeared. For about 200-250 g freeze-dried sample, it took about 1 min to grind. The ground material (1.40-6.00 g) was weighed into 50-ml polypropylene test tubes with screw caps. Then aqueous ethanol solvent containing 2-25% deionized water (98-75% ethanol, weight-by-weight) was added to each test tube at solvent/solid (accounting for the 9% moisture) ratios of 5, 10, 15, 20 and 25 to create treatments with varying water concentrations in the entire extraction system and varying solvent/solid, water/solid, EtOH/solid, water/EtOH ratios as shown in Table 3.

TABLE 2

Makeup of Extract

| Treatment | [EtOH] | [H2O] | 60° C. | | 42.5° C. | | 25° C. | | 10° C. | |
|---|---|---|---|---|---|---|---|---|---|---|
| | | | Dry Solids | Protein | Dry Solids | Protein | Dry Solids | Protein | Dry Solids | Protein |
| | | | mg/mL (in extract) | | | | | | | |
| 1 | 79.5 | 20.5 | 33.2 | 29.0 | 25.5 | 21.8 | 8.2 | 2.8 | 5.7 | 1.2 |
| 2 | 84.2 | 15.8 | 17.0 | 14.6 | 11.5 | 8.4 | 4.3 | 1.0 | 3.0 | 0.4 |
| 3 | 87.5 | 12.5 | 5.7 | 4.6 | 4.4 | 3.1 | 2.3 | 0.3 | 1.3 | 0.1 |
| 4 | 91.7 | 8.3 | 15.8 | 12.6 | 9.2 | 5.6 | 4.5 | 0.6 | 1.4 | 0.1 |
| 5 | 95.8 | 4.2 | 4.1 | 2.2 | 3.5 | 1.8 | 1.9 | 0.1 | 1.2 | 0.0 |
| 6 | 97.0 | 3 | 2.6 | 1.2 | 2.0 | 1.1 | 1.5 | 0.1 | 1.3 | 0.0 |
| 7 | 98.3 | 1.7 | 1.0 | 0.3 | 0.9 | 0.4 | 1.0 | 0.0 | 0.7 | N.D. |

N.D. = not determined

TABLE 3

Experimental conditions for freeze dried Empyreal ® material

| % (wt/wt) | g solvent/g | % (wt/wt) | ratios, g/g | | | |
|---|---|---|---|---|---|---|
| EtOH used | feed (90.66% DS) | EtOH in final solvent | solvent/ 100% DS | water/ 100% DS | EtOH/ 100% DS | EtOH/ water |
| 98 | 25 | 97.63 | 27.5 | 0.65 | 26.82 | 41.24 |
|  | 20 | 97.54 | 22.1 | 0.54 | 21.56 | 39.71 |
|  | 15 | 97.39 | 16.6 | 0.43 | 16.19 | 37.35 |
|  | 10 | 97.09 | 11.1 | 0.32 | 10.78 | 33.37 |
|  | 5 | 96.20 | 5.6 | 0.21 | 5.40 | 25.32 |
| 93 | 25 | 92.65 | 27.5 | 2.02 | 25.45 | 12.61 |
|  | 20 | 92.57 | 22.1 | 1.64 | 20.41 | 12.45 |
|  | 15 | 92.42 | 16.6 | 1.26 | 15.32 | 12.20 |
|  | 10 | 92.14 | 11.1 | 0.87 | 10.25 | 11.72 |
|  | 5 | 91.29 | 5.6 | 0.49 | 5.13 | 10.49 |
| 87 | 25 | 86.67 | 27.6 | 3.67 | 23.89 | 6.50 |
|  | 20 | 86.59 | 22.1 | 2.96 | 19.12 | 6.46 |
|  | 15 | 86.46 | 16.6 | 2.25 | 14.36 | 6.39 |
|  | 10 | 86.19 | 11.1 | 1.53 | 9.58 | 6.24 |
|  | 5 | 85.40 | 5.6 | 0.82 | 4.79 | 5.85 |
| 82 | 25 | 81.69 | 27.5 | 5.04 | 22.50 | 4.46 |
|  | 20 | 81.62 | 22.1 | 4.07 | 18.05 | 4.44 |
|  | 15 | 81.49 | 16.6 | 3.07 | 13.50 | 4.40 |
|  | 10 | 81.24 | 11.1 | 2.08 | 9.01 | 4.33 |
|  | 5 | 80.49 | 5.6 | 1.09 | 4.51 | 4.13 |
| 75 | 25 | 74.72 | 27.4 | 6.94 | 20.50 | 2.96 |
|  | 20 | 74.65 | 22.1 | 5.61 | 16.51 | 2.94 |
|  | 15 | 74.53 | 16.6 | 4.23 | 12.38 | 2.93 |
|  | 10 | 74.30 | 11.1 | 2.86 | 8.26 | 2.89 |
|  | 5 | 73.62 | 5.6 | 1.48 | 4.14 | 2.79 |

The screw-capped test tubes containing both testing material and solvent were horizontally placed in a shaker that was set at 100 rpm orbital motion and maintained at either 25° C. (ambient) or 42.5° C. for 60 min. During the 60 min extraction, the solid was gently moving in the solvent inside the test tubes to allow thorough contacting of the solid particles with the solvent without excessive force to minimize physical break down of solid particles.

After 60 min extraction, the test tubes were centrifuged at 4,000 rpm for 5 min at ambient temperature. The liquid from each test tube was carefully transferred to pre-weighed test tubes to record its net weight. The liquid was analyzed for dry solids, protein, lipid, pigments, soluble carbohydrate and organic acid.

For dry solid and protein analysis, 2.00 ml liquid was carefully pipetted into pre-weighed ceramic Leco cells with the tin inserts. The Leco cells were placed in fume hood for about 4 hours to allow ethanol evaporation then placed into a vacuum oven set at 50° C. and 25-inches vacuum to dry. After weighing again for the calculation of dry solids, the Leco cells were analyzed for protein concentrations (using nitrogen factor of 6.25) in a Leco nitrogen analyzer.

For the analyses of lipid, soluble carbohydrate and organic acid, 10.00 g of the liquid was weighed into a pre-weighed 50-ml polypropylene test tube. The test tubes were placed in fume hood overnight to allow ethanol evaporation. After weighing again for the calculation of remaining aqueous phase, 25.00 g of hexane and 5.00 g of DI water was added to each test tube. The test tubes were vigorously hand-shaken, kept at ambient for about 2 hours then hand-shaken again before centrifugation at 4,000 rpm for 5 min at ambient temperature. Twenty grams (20.00 g) of the hexane layer was transferred into pre-weighed glass beakers and the beakers were placed in fume hood to allow hexane evaporation. After being dried in a vacuum oven set at 55° C. and 25-inches vacuum for 4 hours, the beakers were weighed again for the calculation of lipid.

For pigment analysis, the primary extraction liquid was diluted 10-fold with the same ethanol solvent used for the extraction then absorbance read in a spectrophotometer using 1-cm cell. Absorbance at 446 nm was used for the calculation of pigment concentrations (as lutein using the lutein molar extinction coefficient in ethanol of 145,000 L/mol/cm).

This experiment focused on the effects of two temperatures over the range of solid compositions in a single extraction cycle. The temperatures 25° C. and 42.5° C. were chosen to explore whether temperature had a beneficial effect in increasing the solubility of non-protein solutes under more moderate temperature conditions. The results shown in Tables 4 and 5 indicate that the increase in temperature has a significant effect on protein extraction at higher water concentrations and dissolved solids. There was no significant temperature effect on the other solutes. Higher $H_2O$ concentration was associated with increased dissolution of soluble carbohydrates and organic acids, but a decrease in solubilization of lipid and pigment. Compared to the negative effects of water and temperature on yield, the effects on non-protein solubilization were small.

TABLE 4

The concentration of solutes extracted from freeze-dried destarched protein concentrate (expressed as kg solute per kg extract solution) at 25° C. E/C indicates the ratio of solvent to solids in the extraction.

| E/C ratio | [EtOH] wt % | Solids | Protein | Lipid | Soluble Carbohydrate | Pigment | Organic Acids |
|---|---|---|---|---|---|---|---|
| 25 | 98 | 0.002871 | 0.000222 | 0.001695 | 0.00039 | 0.014987 | 0.000119 |
| 25 | 93 | 0.003568 | 0.000413 | 0.002133 | 0.000665 | 0.017722 | 0.000152 |
| 25 | 87 | 0.003931 | 0.000811 | 0.001958 | 0.00087 | 0.017446 | 0.000133 |
| 25 | 82 | 0.003519 | 0.001135 | 0.001391 | 0.001074 | 0.015867 | 0.000156 |
| 25 | 75 | 0.003627 | 0.00182 | 0.00071 | 0.001124 | 0.013694 | 0.000147 |
| 20 | 98 | 0.003806 | 0.000201 | 0.002142 | 0.000483 | 0.018682 | 0.000136 |
| 20 | 93 | 0.003997 | 0.000508 | 0.002848 | 0.000833 | 0.0222 | 0.000199 |
| 20 | 87 | 0.004172 | 0.000907 | 0.002215 | 0.000966 | 0.01909 | 0.00016 |
| 20 | 82 | 0.004412 | 0.001423 | 0.001579 | 0.001318 | 0.019413 | 0.000215 |
| 20 | 75 | 0.005148 | 0.002472 | 0.000788 | 0.001468 | 0.017528 | 0.000209 |
| 15 | 98 | 0.005114 | 0.000259 | 0.003373 | 0.000598 | 0.02587 | 0.00018 |
| 15 | 93 | 0.005656 | 0.000665 | 0.003083 | 0.001005 | 0.029347 | 0.000244 |
| 15 | 87 | 0.006165 | 0.001302 | 0.003255 | 0.001364 | 0.02612 | 0.000221 |
| 15 | 82 | 0.005782 | 0.001981 | 0.001764 | 0.001711 | 0.025312 | 0.000266 |
| 15 | 75 | 0.007251 | 0.003323 | 0.001398 | 0.001858 | 0.02252 | 0.000277 |
| 10 | 98 | 0.007228 | 0.000381 | 0.005639 | 0.000784 | 0.035982 | 0.000225 |
| 10 | 93 | 0.008231 | 0.000991 | 0.005384 | 0.001348 | 0.043669 | 0.000327 |
| 10 | 87 | 0.008637 | 0.00206 | 0.003711 | 0.002116 | 0.040223 | 0.000423 |
| 10 | 82 | 0.008875 | 0.003035 | 0.002747 | 0.00252 | 0.033385 | 0.000419 |
| 10 | 75 | 0.011162 | 0.005273 | 0.00154 | 0.002528 | 0.031855 | 0.000413 |
| 5 | 98 | 0.014356 | 0.000764 | 0.010572 | 0.001561 | 0.081216 | 0.000457 |
| 5 | 93 | 0.015564 | 0.002115 | 0.009363 | 0.002301 | 0.084404 | 0.00053 |
| 5 | 87 | 0.015246 | 0.004295 | 0.006228 | 0.003451 | 0.076992 | 0.000684 |
| 5 | 82 | 0.017476 | 0.006417 | 0.004707 | 0.004277 | 0.070087 | 0.000782 |
| 5 | 75 | 0.024266 | 0.012327 | 0.002106 | 0.005452 | 0.059482 | 0.00101 |

TABLE 5

The concentration of solutes extracted from freeze-dried destarched protein concentrate (expressed as kg solute per kg extract solution) at 42.5° C. E/C indicates the ratio of solvent to solids in the extraction.

| E/C ratio | [EtOH] wt % | Solids | Protein | Lipid | Soluble Carbohydrate | Pigment | Organic Acids |
|---|---|---|---|---|---|---|---|
| 25 | 98 | 0.003869 | 0.000456 | 0.002139 | 0.000305 | 0.016941 | 0.000209 |
| 25 | 93 | 0.004798 | 0.000855 | 0.002303 | 0.000592 | 0.016945 | 0.000156 |
| 25 | 87 | 0.006169 | 0.001582 | 0.001424 | 0.00083 | 0.017192 | 0.000206 |
| 25 | 82 | 0.007038 | 0.002657 | 0.000573 | 0.000999 | 0.014869 | 0.000232 |
| 25 | 75 | 0.015621 | 0.010979 | 0.000471 | 0.001005 | 0.014243 | 0.000232 |
| 20 | 98 | 0.004866 | 0.000507 | 0.002782 | 0.000586 | 0.020758 | 0.000246 |
| 20 | 93 | 0.006088 | 0.001089 | 0.001989 | 0.000702 | 0.02163 | 0.000259 |
| 20 | 87 | 0.007679 | 0.00184 | 0.002284 | 0.000998 | 0.021352 | 0.000233 |
| 20 | 82 | 0.010554 | 0.004975 | 0.001088 | 0.001385 | 0.015777 | 0.000324 |
| 20 | 75 | 0.01825 | 0.013319 | 0.000742 | 0.00125 | 0.016364 | 0.000308 |
| 15 | 98 | 0.0058 | 0.000623 | 0.003541 | 0.000565 | 0.027756 | 0.000362 |
| 15 | 93 | 0.007684 | 0.001433 | 0.003318 | 0.001044 | 0.028503 | 0.000328 |
| 15 | 87 | 0.009489 | 0.002329 | 0.002411 | 0.001411 | 0.026743 | 0.000422 |
| 15 | 82 | 0.012935 | 0.006652 | 0.001598 | 0.001608 | 0.024249 | 0.00045 |
| 15 | 75 | 0.025145 | 0.018275 | 0.001227 | 0.001769 | 0.022059 | 0.000427 |
| 10 | 98 | 0.009345 | 0.001016 | 0.005637 | 0.000822 | 0.042845 | 0.000509 |
| 10 | 93 | 0.011486 | 0.002154 | 0.005273 | 0.001197 | 0.043597 | 0.000663 |
| 10 | 87 | 0.013286 | 0.003805 | 0.003292 | 0.002087 | 0.039775 | 0.000683 |
| 10 | 82 | 0.019835 | 0.011226 | 0.001825 | 0.002226 | 0.033496 | 0.00069 |
| 10 | 75 | 0.038979 | 0.029437 | 0.000919 | 0.002518 | 0.031568 | 0.000883 |
| 5 | 98 | 0.017526 | 0.002175 | 0.011554 | 0.001516 | 0.083057 | 0.000152 |
| 5 | 93 | 0.020342 | 0.004068 | 0.009541 | 0.002404 | 0.081142 | 0.000151 |
| 5 | 87 | 0.022596 | 0.008837 | 0.005348 | 0.003346 | 0.068459 | 0.000197 |
| 5 | 82 | 0.037449 | 0.022848 | 0.004158 | 0.003372 | 0.061414 | 0.000169 |
| 5 | 75 | 0.079795 | 0.063349 | 0.003373 | 0.004593 | 0.055685 | 0.000466 |

Figure 2A:
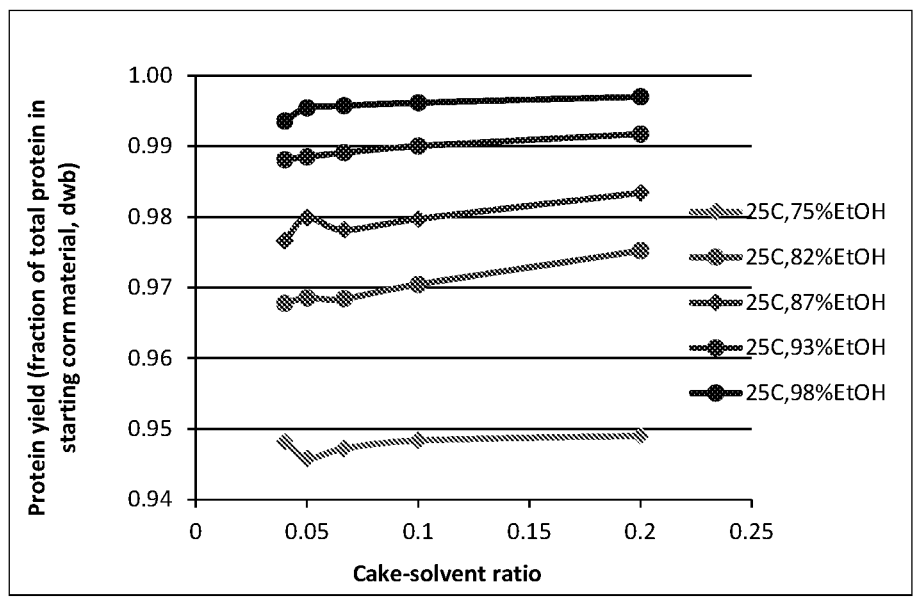
FIGS. 2A and 2B illustrate overall protein yield as a function of cake-solvent ratio, EtOH concentration at 25° C. (2A) and 42.5° C. (2B). Note that the two figures have different vertical scales.
Figure 2B:
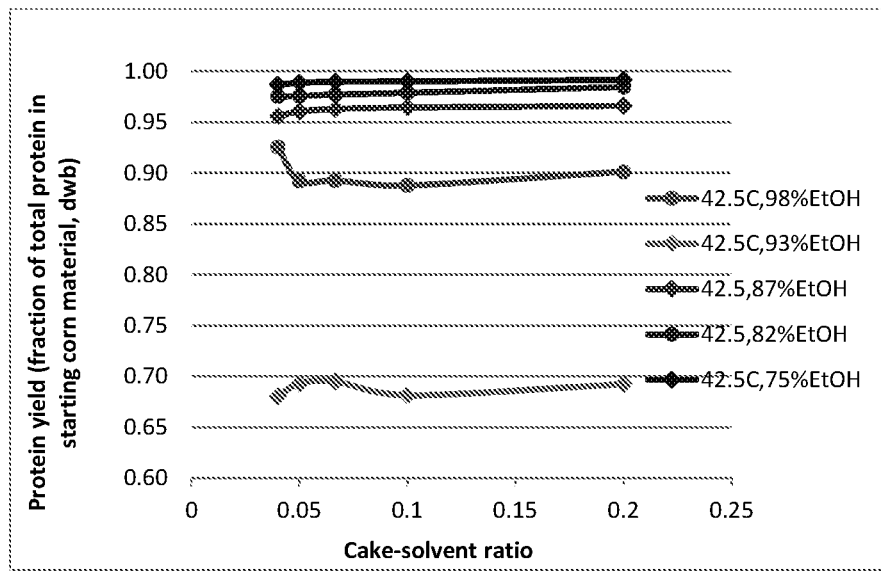

The overall effect of the effects of solvent composition and temperature on the protein are shown in FIGS. 2A and 2B, where the yield of total protein, expressed as the percentage of protein remaining after extraction (on a dry weight basis) is clearly higher in solvent with lower water concentration and at lower temperature.

Example 3

One of the operational issues that may arise relates to fouling of equipment. Under some circumstances, protein material dries or bakes onto surfaces and eventually impairs production. This may result in burnt product or insufficiently desolventized product. Though fouling may occur at multiple points, the most severe effects are found during desolventizing. The problem seems most severe when more water was present in the extracted product.

Destarched frozen corn protein concentrate (without peroxide treatment) was taken from the freezer and allowed to thaw in the refrigerator. The moisture of the cake was measured with a moisture balance and the amount of absolute EtOH to achieve set solvent concentrations was calculated (See Table 6 for treatments). The solvent was weighed into a 250 mL Erlenmeyer flask, stoppered, and brought to approximately the treatment temperature in a water bath. The destarched corn protein concentrate was weighed out and allowed to warm to about room temperature. The corn protein concentrate was added to the solvent and immediately homogenized with a hand-held Biohomogenizer at full speed to break up as many corn protein concentrate lumps as possible.

TABLE 6

The sample conditions used to prepare samples for compressibility and tack measurement.

| Corn protein Concentrate (g) | EtOH (g) | water (g calc) | [EtOH] wt % |
|---|---|---|---|
| 20 | 35 | 11.79 | 75 |
| 20 | 50 | 11.79 | 81 |
| 20 | 50 | 11.79 | 81 |
| 20 | 70 | 11.79 | 86 |
| 20 | 110 | 11.79 | 90 |
| 20 | 180 | 11.79 | 94 |

The flask was stoppered again and placed in the water bath for 30 minutes with occasional swirling. The intent was less to insure perfect extraction than to insure complete solvation of the solids. At the end of the incubation, the solids were collected on a Buchner funnel with Whatman #1 paper. Filtration was stopped when the cake cracked or the drip rate fell below about 1 drop/sec. The cake was immediately broken up with a spatula and transferred to a covered plastic dish to create a uniform depth and diameter of sample.

The sample was immediately moved to the Anton-Paar Modular Compact Rheometer (Model MCR502) which was set up with a PR25 probe. The probe descended until it made contact with the cake and then continued to press into the cake at 1 mm/sec until the probe created 10 N of normal force at which time it withdrew at 1 mm/sec. Essentially, two effects could be observed. The amount of depth obtained by the probe was a measure of compressibility (or flow) and the negative force upon withdrawal was a measure of stickiness or tack. The depth of compression was converted to a strain measurement.

Figure 3:
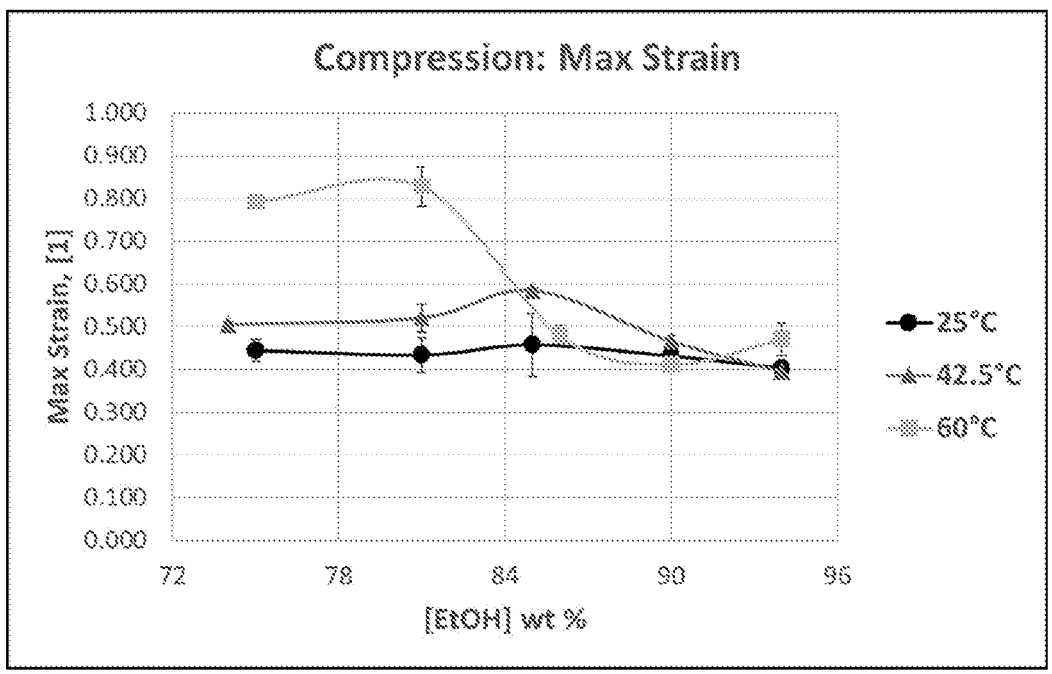
FIG. 3 illustrates the maximum strain of Empyreal® samples after solvent exposure at 25° C., 42.5° C. and 60° C.

FIG. 3 shows that there is a meaningful interaction between the water in the solvent and the temperature of incubation that leads to differences in compressibility. It is important to note that the temperature of all of the samples was approximately ambient at the point of measurement. The figure shows the maximum strain experienced by the sample, which means the maximum amount of compression experienced by the sample (normalized for its height). Samples prepared at 25° C. and 42.5° C. reached the "trigger" force of 10 N at about half their depth, but samples prepared at 60° C. and greater than 20% water could reach about 80% of their depth. Samples prepared in the more compressible state comprised particles that were softer and more flowable.

Figure 4:
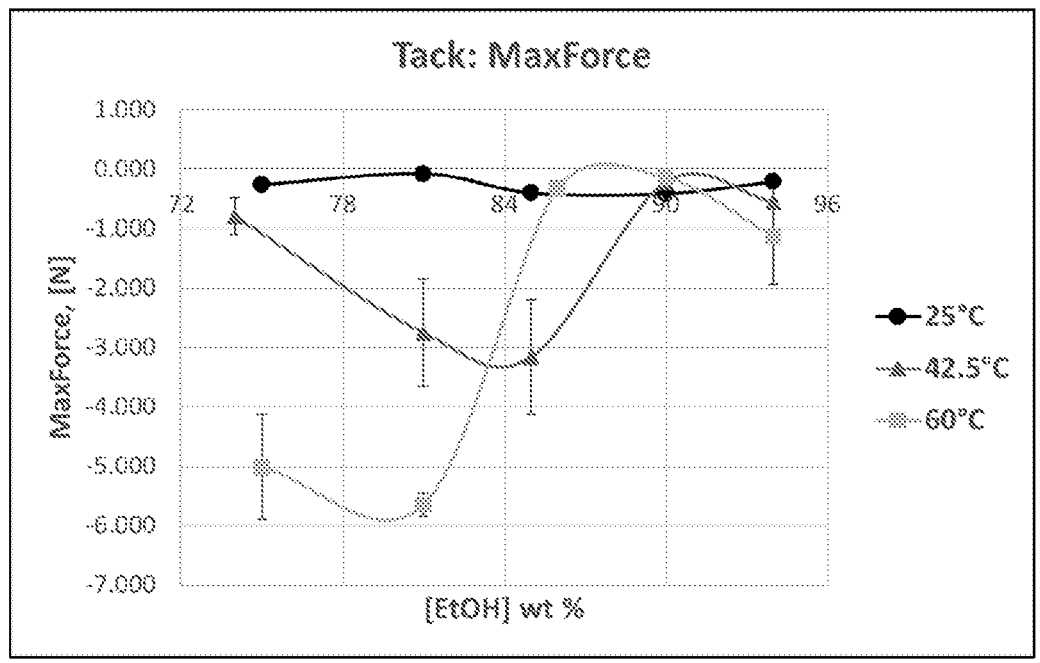
FIG. 4 illustrate the maximum tack force (measured in Newtons) of Empyreal® samples after solvent exposure at 25° C., 42.5° C. and 60° C.

A similar pattern was visible in the tack measurements (FIG. 4) though the intermediate temperature appeared "shifted" towards higher [EtOH]. Above 90% [EtOH], sample treatments were very similar. Tackiness is a negative force, so a stronger force is associated with the deeper trough in the force profile. At 25° C., solvent composition did not appear to effect tackiness. But at 42.5° C., and maybe at 60° C., there appears to be greater stickiness below about 85 wt % EtOH.

Taken together, these results demonstrate that low temperature exposure does not pre-dispose corn protein isolate samples to become compressible and sticky. Even higher temperature does not pre-dispose the materials to compressibility of tackiness unless the water concentration of the solvent rises above about 15 wt %. This is similar to the preferred conditions for extraction as well, so the preferred solvent for product yield and quality is also the best solvent for further processing. Another experiment was conducted where a sample of corn protein concentrate was exposed to progressive increases in [EtOH] to mimic the effect of a counter-current extractor at the three temperatures. Samples showed the behavior of samples that had been treated at high [EtOH] only. There was more variation between replicates than between temperatures. This means that the only solvent that really matters is the solvent that is entrained in the product.

Example 4

Protein ingredients are almost always functionally important in the foods they are added to. They may bind water, emulsify oils and fats, provide bulk physical presence or create viscosity. Foods that contained added proteins vary enormously in the functionalities that they require. In some cases, for example processed meats, a protein ingredient may desirably bind a lot of water and form a viscous dispersion or gel during heating. In some cases, for example bread, a useful protein ingredient will bind minimal water, generate minimal viscosity during proofing or baking, and offer a soft texture (non-gritty) in the finished bread. Essentially opposite characteristics are desired in these two cases. Protein ingredient manufacturers may need to create processes that alter the functionality of their proteins to be useful in foods.

To test the effect of desolventizing conditions on materials extracted at different EtOH concentrations and temperatures, larger samples were prepared following the procedure of Example 2, but with some modification. In one case, destarched corn protein concentrate cake (Empyreal®) containing about 60% moisture was obtained at corn milling plant in Blair, NB. The wet cake was freeze dried to 9.34% moisture. The freeze dried Empyreal® material (200.0 g) was rehydrated by adding varying amounts of de-ionized water to target 98%, 93%, 87%, 82% and 75% (wt/wt) ethanol after absolute ethanol is mixed at total solvent (water+ethanol)/solid (as-is 9.34% moisture) ratio of 10 (wt/wt). The mixture was extracted at either 25° C. (ambient) or 42.5° C. for one hour. After extraction, the solids were collected by centrifugation and stored in the refrigerator until desolventization by one of two different methods. For each extraction treatment, the solvent-laden solids were split into 2 portions. One portion was dried using a rotary evaporator with a bath temperature of 130° C. and about 19 to 26 inches vacuum with running tap water to cool the condenser. The other portion was dried by evaporation under vacuum near or below 0° C. Both rotary evaporator-dried and freeze-dried samples were ground and sieved through a <105 micron screen before viscosity analysis. The loss on drying (LOD) was measured with a moisture balance for each sample prior to viscosity preparation. A six-gram sample, adjusted for LOD to equal solids, was then weighed into a tared Rapid Visco Analyzer (RVA) sample vessel and the vessel was filled to 30 g with deionized water. The prepared samples were stirred and allowed to hydrate for 20 minutes then analyzed on a RVA (Perten Instruments). The canister was mounted onto the RVA and the following profile was applied. The sample was mixed at 960 rpm at 25° C. for 5 minutes then mixed at 100 rpm for the remainder of the test. At 15 minutes, the temperature ramp was initiated with the temperature increased 10° C./minute until 75° C. was reached. The temperature was held at 75° C. for 5 minutes, then the sample was cooled at 3.3° C./minute until 25° C. was reached. It is much more difficult to cool samples than heat them, so the profile is asymmetric. The samples was mixed at 25° C. for another 20 minutes. Viscosity was recorded every eight seconds, but the most important parameter is generally the peak viscosity observed.

Figure 5A:
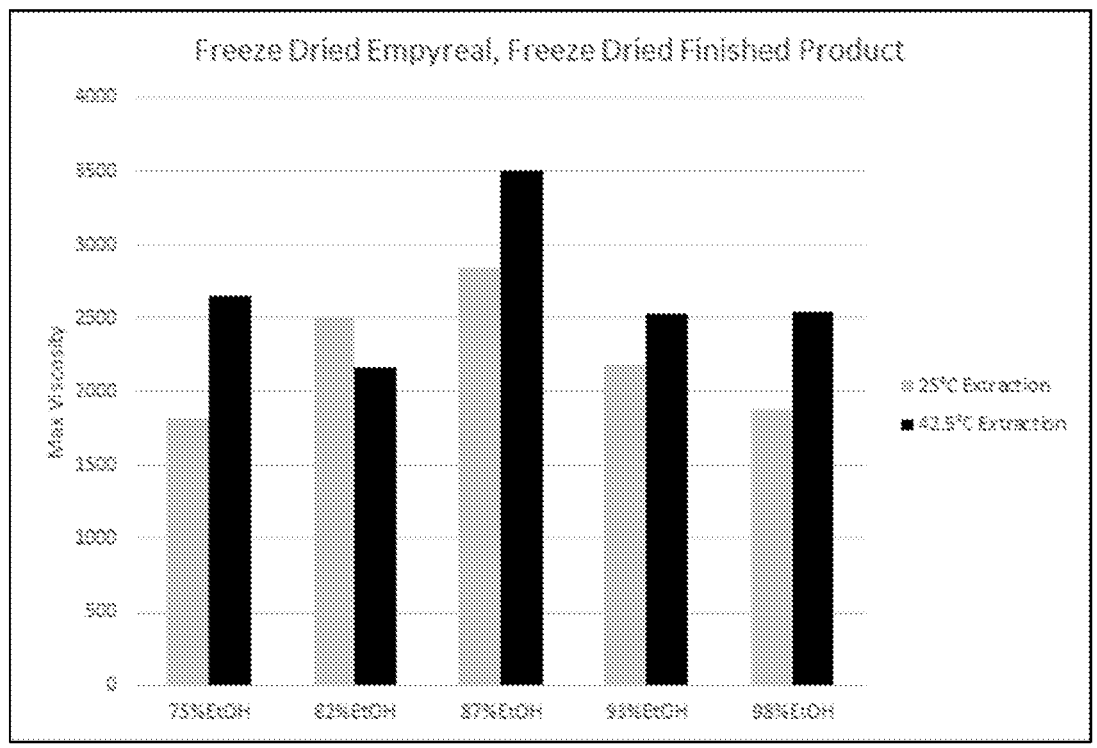
FIGS. 5A and 5B illustrate maximum viscosities of freeze dried Empyreal® extracted at 25° C. and 42.5° C. then freeze dried (SA) or dried at 130° C. using a rotary evaporator (5B).
Figure 5B:
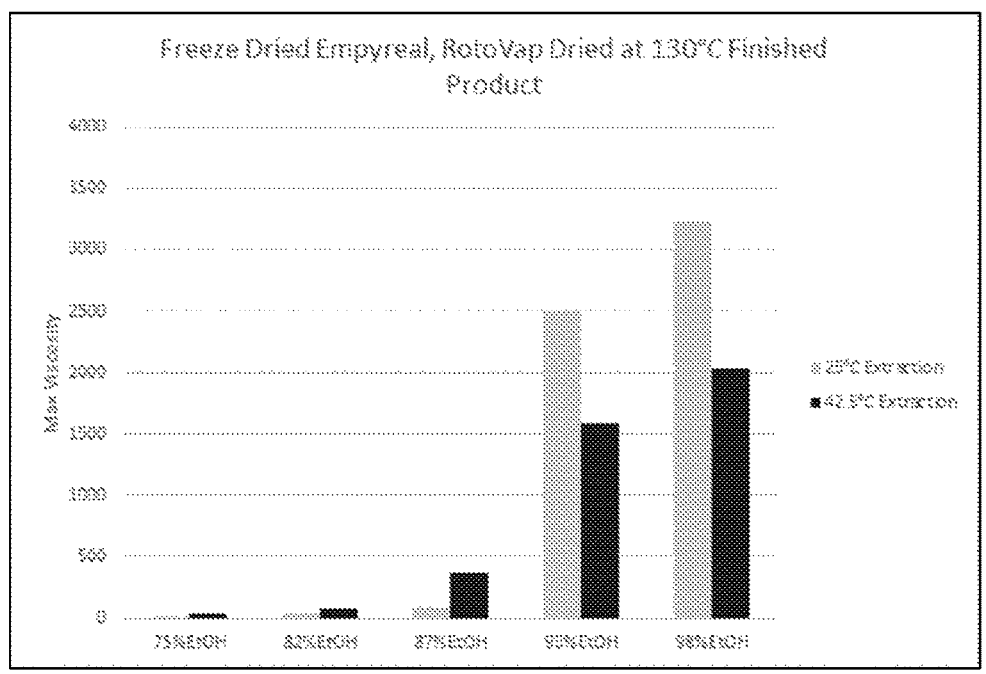

The finished product samples that were exposed to low temperatures during desolventization had high viscosities regardless of EtOH concentration or temperature during extraction (FIG. 5, left). When desolventization was done at high temperature (130° C.), material extracted at EtOH concentration of 87% or lower formed a thick coating which "burnt" on the wall during desolventization, produced a darker final product with very low viscosities. In comparison, material extracted at high EtOH concentrations formed little coating during desolventization at 130° C., resulting in light-colored final products with high viscosities (FIG. 5, right). This demonstrates that the combination of water content and high heat is significantly affecting the product viscosity. Extraction temperature did not appear to have a very large effect on viscosity although the 25° C. extraction produced product with higher viscosities when dried at high temperatures.

The invention claimed is:

1. A method of maintaining corn protein yield during extraction of corn material to obtain a corn protein isolate, comprising:

obtaining a destarched corn gluten meal comprising at least 70 wt % corn protein on a dry weight basis; and treating the destarched corn gluten meal to obtain a desolventized corn protein isolate by a method consisting essentially of a) carrying out an extraction of non-protein solutes from the destarched corn gluten meal by washing the destarched corn gluten meal to extract the non-protein solutes with an ethanol-water solvent comprising at least 85 wt % ethanol to obtain a corn protein isolate;

b) collecting the corn protein isolate in the form of collected solids from the ethanol-water solvent extraction step a), wherein the collected solids comprises residue ethanol-water solvent; and c) desolventizing the residue ethanol-water solvent from the collected solids of step b) by drying with heat to provide a desolventized corn protein isolate;

wherein the extraction occurs at temperatures ranging from about 5-50° C., wherein the amount of total water present in the ethanol-water solvent extraction step a) is limited such that less than 10% of the corn protein content is removed from the corn material by the ethanol-water solvent during the extraction, and wherein the amount of water present in the collected solids collected in step b) is limited such that the collected solids comprising the residue ethanol-water solvent has a tack force ranging from −1.000 to 0 at 42.5° C.

2. The method of claim 1, wherein the extraction occurs at temperatures ranging from about 20-30° C.

3. The method of claim 1, wherein the ethanol-water solvent comprises at least 90 wt % ethanol.

4. The method of claim 1, wherein the ethanol-water solvent comprises at least 95 wt % ethanol.

5. The method of claim 1, wherein the corn protein isolate comprises 87-98 wt % corn protein on a dry weight basis.

6. The method of claim 1, wherein the corn protein isolate has a viscosity ranging from 1500-3500 centipoise.

7. The method of claim 1, wherein less than 5% of the corn protein content is removed from the corn material during the extraction.

8. The method of claim 1, wherein the corn protein isolate has a maximum compressibility strain of 0.600.

9. The method of claim 1, wherein the corn protein isolate comprises 55-98 wt % corn protein on a dry weight basis.

10. The method of claim 1, wherein the corn protein isolate comprises 87-98 wt % corn protein on a dry weight basis.

11. The method of claim 1, wherein the desolventizing is carried out by a rotary evaporator.

\* \* \* \* \*

UNITED STATES PATENT AND TRADEMARK OFFICE
CERTIFICATE OF CORRECTION

| | |
|---|---|
| PATENT NO. | : 11,985,990 B2 |
| APPLICATION NO. | : 16/335604 |
| DATED | : May 21, 2024 |
| INVENTOR(S) | : Christopher Lawrence Frank et al. |

It is certified that error appears in the above-identified patent and that said Letters Patent is hereby corrected as shown below:

In the Specification

In Column 1, Line 60, delete "(SA)" and insert -- (5A) --, therefor.

Signed and Sealed this
Twenty-second Day of October, 2024

Katherine Kelly Vidal
*Director of the United States Patent and Trademark Office*